G. W. FORD.
APPARATUS FOR OPERATING TWO MECHANISMS IN SYNCHRONISM.
APPLICATION FILED JAN. 6, 1914.
1,153,210.
Patented Sept. 14, 1915.
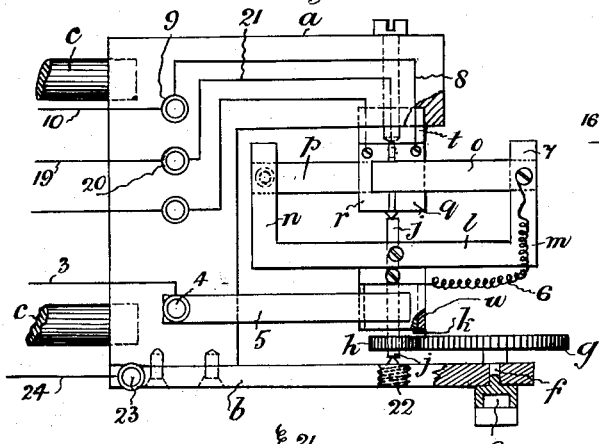
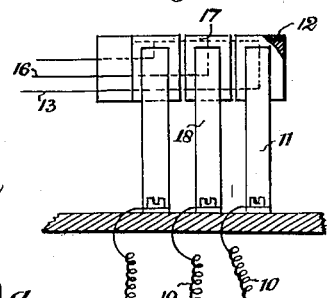
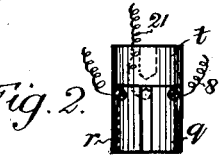
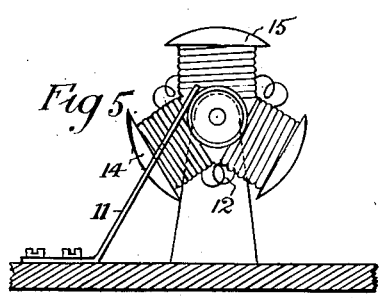
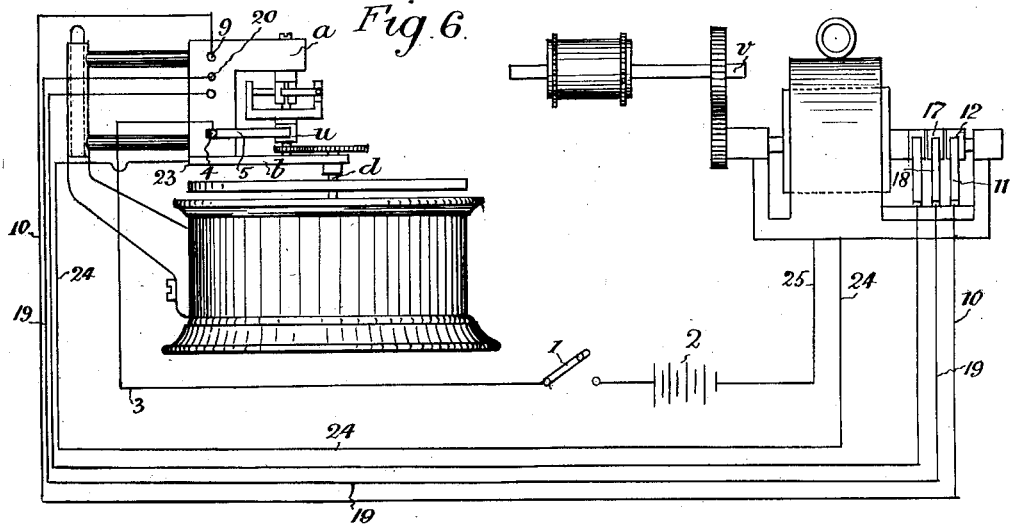

UNITED STATES PATENT OFFICE.

GEORGE WILLIAM FORD, OF GOUROCK, SCOTLAND.

APPARATUS FOR OPERATING TWO MECHANISMS IN SYNCHRONISM.

1,153,210.   Specification of Letters Patent.   Patented Sept. 14, 1915.

Application filed January 6, 1914. Serial No. 810,639.

*To all whom it may concern:*

Be it known that I, GEORGE WILLIAM FORD, 52 Shore street, Gourock, Renfrewshire, Scotland, mechanic, have invented certain new and useful Apparatus for Operating Two Mechanisms in Synchronism, of which the following is a specification.

This invention relates to an apparatus for operating a cinematograph camera or projector in synchronism with a sound producing or recording machine such as a gramophone, automatic piano or the like.

The object of the present invention is to provide means whereby the action of a cinematograph or the like is controlled by the action of a gramophone or the like or vice versa.

There are many well known methods of obtaining synchronous motion in two separate machines by operating an electrical commutator or distributer apart from the electric motor it controls. In this invention the operation of the commutator is effected by the minimum of brushes and collector rings. By utilizing the center spindle supporting the revolving brush bracket as a conductor, a collecting ring and brush for one commutator brush is dispensed with. Other collecting rings and brushes are dispensed with as the commutator is stationary and thereby connected direct with the electrical circuit. The mechanical power necessary to operate the invention is therefore almost negligible, and as the margin of power available from an ordinary gramophone motor above that required to drive the record is small the present invention is readily adaptable to existing gramophones.

In order that my invention may be clearly understood I have hereunto appended drawings which show by way of example and diagrammatically a method of carrying out my invention.

Figure 1 shows the support for the commutator and gear driven by the gramophone for operating the brushes which revolve around the commutator. Fig. 2 shows a side elevation of the commutator. Fig. 3 shows a sectional plan of the commutator. Fig. 4 shows a side elevation of the collecting rings on the armature spindle of the motor with brushes. Fig. 5 shows an end elevation of armature looking on collector ring end with brushes. Fig. 6 shows a general arrangement showing electric connections between gramophone and cinematograph, the tone arm and sound box of the gramophone being omitted for sake of clearness.

Under this invention I provide: a tripolar electric motor the motion of which is controlled by operating a commutator separately from the armature of the motor.

Referring to the drawings an insulated arm $a$ such as ebonite with plate $b$ attached on under side, carrying between them the operating gear, is supported from the gramophone by brackets $c$. The gramophone spindle $d$ has a slot cross-cut on its top end arranged to engage with blade $e$ formed on lower end of spindle $f$ which spindle carries gearwheel $g$ engaging with pinion $h$. Pinion $h$ is in electric contact with spindle $j$ which passes through an insulating block $k$. On upper end of spindle $j$ is mounted a revolving bracket $l$ with arms $m$ and $n$. These arms $m$ $n$ carry brushes $o$ and $p$ bearing on commutator consisting of three sections $q$ $r$ $s$ which are mounted on insulated block $t$, this block $t$ being fixed to arm $a$ by a screw. The mechanical motion derived from gramophone is transmitted through the gearing $g$ and $h$ and spindle $j$ to revolving bracket $l$. On closing switch 1 the electric current passes from source of supply 2 through conductor 3 and terminal 4 to brush 5. Brush 5 bears on collector ring $u$ which is mounted on insulated block $k$. The current passing from collector ring $u$ through conductor 6 to terminal on brush $o$ which is insulated from arm $m$ by insulated block 7. From brush $o$ which bears on commutator, the current passes through sections $q$ $r$ $s$ in rotation. Following through one section for the sake of clearness, say $q$ the current passes along conductor 8 to terminal 9 and by conductor 10 to brush 11 bearing on collector ring 12 which is insulated from the armature spindle and from other collecting rings thereon. Connected to collector ring 12 is a conductor 13 which passes through collector ring insulation to one pole of tripolar armature say 14 to armature pole 15 to conductor 16 to ring 17 to brush 18 to conductor 19 to terminal 20 to conductor 21 to commutator section $s$ to brush $p$ to arm $n$ to bracket $l$ to spindle $j$ through bearing 22 to plate $b$ to terminal 23 to conductor 24 through field coils of electric motor and back by conductor 25 to source of supply 2 and thereby completing the field circuit. Similarly with the other commutator sections $r$ and $s$.

The commutator therefore being electrically connected with corresponding sections of the tripolar armature of the motor as described above, these sections are thereby energized and the armature thereby revolves in synchronism, the motion being imparted by a suitable form of gearing to the shaft of a cinematograph or the like. The commutator may be operated by the cinematograph and the motor be used to operate an automatic piano, or effect machine to produce the sound of rain, breakages and the like.

In my apparatus however by insulating one brush from the revolving bracket and having the other brush in electric contact therewith, necessitates only one collector for the field circuit, thereby increasing the mechanical efficiency of the gramophone motor.

My apparatus having a fixed commutator with two revolving brushes, and only one collector brush, increases the mechanical efficiency to such an extent as to enable me to attain the desired effect with only one motor driving the gramophone which in turn revolves the brushes around the fixed commutator.

Claim.

An apparatus for operating a cinematograph camera or projector in synchronism with a sound producing or recording machine comprising in combination a tripolar electric motor, a fixed commutator for said motor, a bracket mounted to revolve around the axis of said commutator, two brushes mounted to revolve with said bracket, one of said brushes being in electrical connection with the outer circuit through its support, spindle and bearing, the other brush being insulated from the bracket but in connection with the outer circuit through a connecting ring and brush.

In witness whereof I affix my signature in presence of two witnesses.

GEORGE WILLIAM FORD.

Witnesses:
JOHN LIDDLE,
JOHN TRAIN LIDDLE.